(12) United States Patent
Byren et al.

(10) Patent No.: US 8,284,490 B2
(45) Date of Patent: Oct. 9, 2012

(54) LOW-ABERRATION OPTICAL WINDOW

(75) Inventors: Robert W. Byren, Manhattan Beach, CA (US); Vijay Murgai, Irvine, CA (US); Vladimir V. Shkunov, San Pedro, CA (US); Michael Ushinsky, Irvine, CA (US)

(73) Assignee: Raytheon Company, Waltham, MA (US)

( * ) Notice: Subject to any disclaimer, the term of this patent is extended or adjusted under 35 U.S.C. 154(b) by 120 days.

(21) Appl. No.: 12/874,919

(22) Filed: Sep. 2, 2010

(65) Prior Publication Data

US 2012/0057238 A1    Mar. 8, 2012

(51) Int. Cl.
*G02B 1/10* (2006.01)
*H01Q 15/02* (2006.01)
*H01Q 15/24* (2006.01)

(52) U.S. Cl. ........................... 359/580; 343/909

(58) Field of Classification Search .................. 343/909; 359/240, 580, 586
See application file for complete search history.

(56) References Cited

U.S. PATENT DOCUMENTS

| | | | |
|---|---|---|---|
| 3,971,939 A | | 7/1976 | Andressen |
| 5,993,981 A | * | 11/1999 | Askinazi et al. ............... 428/699 |
| 6,788,273 B1 | | 9/2004 | Schultz et al. |
| 6,859,114 B2 | | 2/2005 | Eleftheriades et al. |
| 7,218,285 B2 | | 5/2007 | Davis et al. |
| 7,499,221 B2 | | 3/2009 | Nishioka |
| 8,180,213 B2 | | 5/2012 | Young et al. |
| 2004/0169616 A1 | | 9/2004 | Schultz et al. |
| 2006/0028385 A1 | | 2/2006 | Davis et al. |
| 2007/0201149 A1 | | 8/2007 | Nishioka |
| 2008/0118104 A1 | | 5/2008 | Ariyur et al. |
| 2010/0067091 A1 | | 3/2010 | Smith et al. |

FOREIGN PATENT DOCUMENTS

GB    2 382 230 A    5/2003

OTHER PUBLICATIONS

Li et al., "Photonic Band Gap from a Stack of Positive and Negative Index Materials", Physical Review Letters, vol. 90, No. 8, (Feb. 28, 2003), pp. 083901-1-083901-4.*
R. Aylo et al., "Perturbed multilayered structures of positive and negative index materials", J. Optical Soc. of America B, vol. 27, No. 3, p. 599 (2010).
Anantha, R. S., "Physics of negative refractive index materials", Reports on Progress in Physics, Inst. of Physics Publishing, vol. 68, No. 2, pp. 449-521 (2005).
European Search Report dated Dec. 7, 2011 of European Appl. No. 11172422.5 filed Jul. 1, 2011 (7 pages).
Vodo, P. et al., "Focusing by Planoconcave Lens Using Negative Refraction," Applied Physics Letters 86, American Institute of Physics, May 10, 2005.
Zhang, Shuang et al., "Near-Infrared Double Negative Metamaterials", Optics Express 4922, vol. 13, No. 13, Jun. 27, 2005.

* cited by examiner

Primary Examiner — Alessandro Amari
(74) Attorney, Agent, or Firm — Lando & Anastasi, LLP

(57) ABSTRACT

An optical window may be configured to minimize optical aberrations. The optical window may include a laminous optical window assembly. The laminous optical window assembly may have four or more alternating layers of positive refraction material layers and negative refraction material layers. The four or more alternating layers may be configured to minimize refraction of electromagnetic rays propagating therethrough such that a given incident electromagnetic ray is substantially collinear with a corresponding transmitted electromagnetic ray.

22 Claims, 2 Drawing Sheets

LOW-ABERRATION OPTICAL WINDOW

BACKGROUND

This disclosure relates to optical windows having alternating positive refraction material layers and negative refraction material layers such that optical aberrations are minimized for optical transmission.

Optical windows are used in many applications, such as, for example, airborne electro-optical systems. For example, optical window may be used to isolate delicate optical sensors and/or other devices from the external environment (e.g., aerodynamic pressure, buffeting, particulate debris, salt spray, fungus and other contaminants, handling, and/or other factors), to provide a clear aperture with minimal optical aberration across the sensor field of travel and field of regard, to provide a smooth conformal surface to minimize aerodynamic drag impact on aircraft speed and range, to provide a conductive outer surface that is shaped to minimize the radar cross section of the air vehicle, and/or for other purposes. Conventionally, these are often conflicting requirements and may necessitate severe compromises between sensor performance, sensor durability, aerodynamic performance, radar observability, and/or other factors.

Typically, spherical transparent domes with concentric inner and outer surfaces are used on missiles and aircraft as optical windows to protect sensitive sensing equipment located inside. The axes of rotation for a gimbaled optical system within such domes typically intersect the center of curvature such that the optical power of the dome is the same for all pointing angles. These dome/window structures are typically made of a material with higher positive index of refraction than the surrounding medium (typically air) and, due to the curvature, distort optical rays propagating therethrough. To lowest order, the aberration may be in the focus term (i.e., referring to a Zernike polynomial decomposition of an optical aberration) with the window acting as a weak negative lens. However, higher order aberration terms may also be present, and become most severe as the aperture size approaches the inner dome diameter. The severity of the aberration is also dependent on the mismatch in refractive index between the dome material and the surrounding medium. For example, a transparent dome that has the same index as water will exhibit no refractive power in a water medium.

Geometrically conformal aerodynamic shapes may be desirable for aircraft window applications to minimize the aerodynamic drag, aero-optic boundary layer distortions, radar cross section (for stealthy airframes), and/or for other advantages. Ball-in-frustum and blunted ogive shapes may be desirable for missile domes for similar reasons. Unfortunately, conformal aerodynamic, ball-in-frustum, and blunted ogive shapes introduce severe optical distortions that are not the same for all pointing angles. Dynamic compensation optics and deformable mirrors have been used in the past to address this need, but these tend to increase the size and weight of the sensing system, reduce the reliability of the weapon system due to the number of additional moving parts (some of which need to remain precisely aligned) and control electronics, and increase cost due to the added complexity and number of additional precision optical elements.

Conventional approaches, such as that illustrated by optical window 100 in FIG. 1, teach the use of a single negative index compensating layer 102 that is physically thick (i.e., about a half of the entire windows thickness) abutted to a single positive index layer 104. Furthermore, the negative index layer is transparent for radiation at wavelengths to be compensated. Unfortunately, these requirements can be conventionally satisfied only for wavelengths in the microwave radiation domain. Applicants are unaware of any negative index materials or negative refraction materials known today for short optical wavelengths (e.g., ultraviolet, visible, infrared, and/or other short optical wavelengths) that can be physically thick (e.g., a few millimeters) and, at the same time, be physically strong and transparent. A failure to meet these three requirements makes the design of an optical window (e.g., an aircraft sensor window or missile dome) operating at the short optical wavelengths infeasible.

Another issue faced by conventional teachings is that, as the angle of incidence of an incident ray 106 (i.e., the angle between the incident ray 106 and the normal to the entrance surface of the negative index compensating layer 102) increases, refractive wedging occurs within one layer that is not compensated by the other. Also, the propagation distance through one layer is different than through the other and a boresight shift will result. As such, a given incident electromagnetic ray (e.g., the incident ray 106) will not be collinear and/or parallel with the corresponding transmitted electromagnetic ray (e.g., transmitted ray 108). It is noteworthy that the angular deviation and boresight shift in one conventional approach results, not from any theoretical problem in using negative index materials or negative refraction materials for refractive compensation, but from the thickness of the layers.

SUMMARY

One aspect of this disclosure relates to an optical window configured to minimize optical aberrations. The optical window may include a laminous optical window assembly. The laminous optical window assembly may have four or more alternating layers of positive refraction material layers and negative refraction material layers. The four or more alternating layers may be configured to minimize refraction of electromagnetic rays propagating therethrough such that a given incident electromagnetic ray is substantially collinear with a corresponding transmitted electromagnetic ray.

Another aspect of this disclosure relates to a system comprising an optical device and an optical window. The optical device may be configured to receive electromagnetic rays. The optical window may be configured to house the optical device. The optical window may be further configured to minimize refraction of electromagnetic rays propagating therethrough such that a given incident electromagnetic ray is substantially collinear with a corresponding transmitted electromagnetic ray that is received by the optical device.

These and other features and characteristics of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
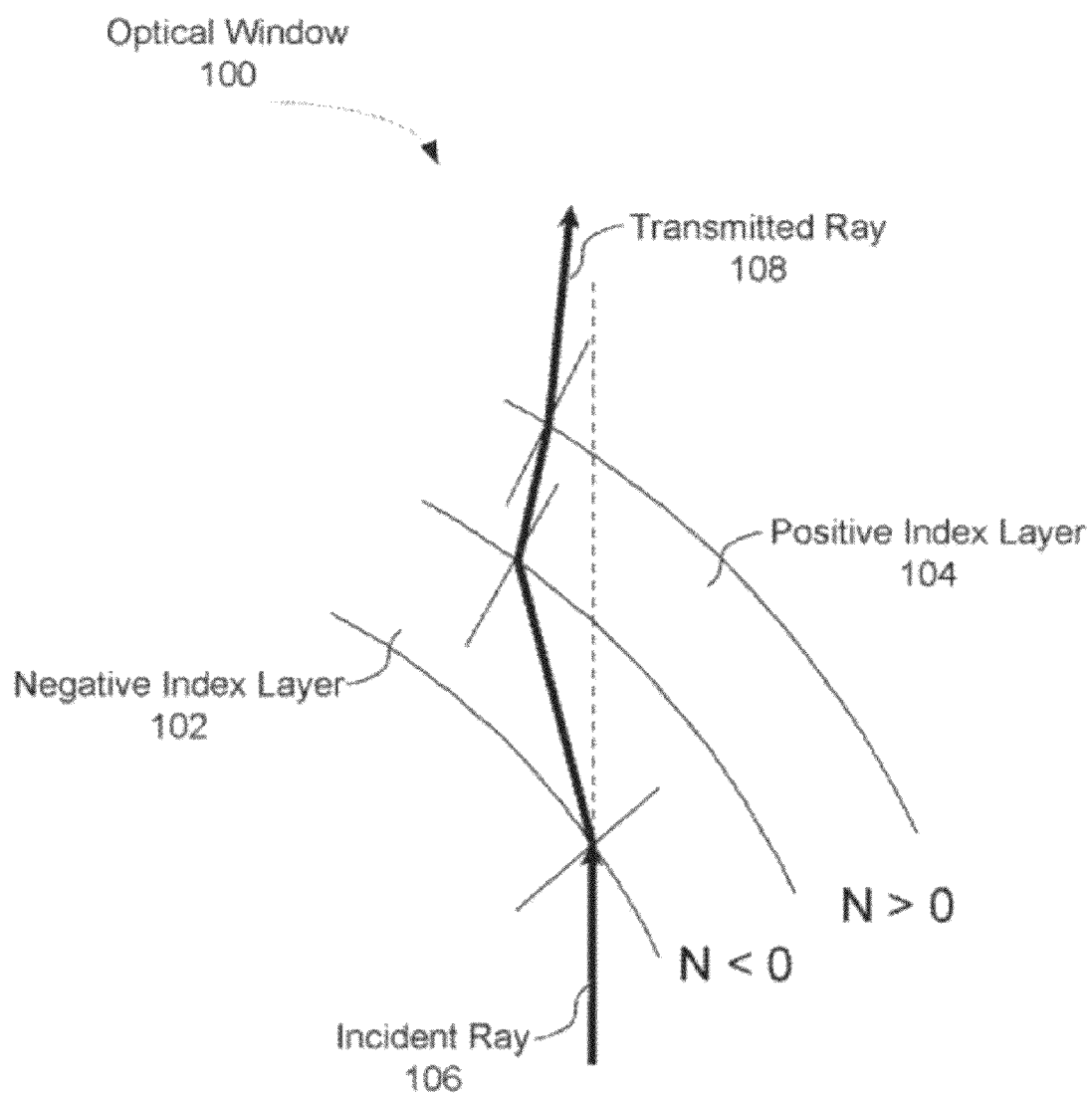
FIG. 1 illustrates an optical window, according to one or more conventional approaches.

Exemplary embodiments of this disclosure include an optical window configured to reduce and/or minimize refraction of electromagnetic rays propagating therethrough such that a given incident electromagnetic ray is substantially collinear with a corresponding transmitted electromagnetic ray. By using a multi-layer laminate structure of alternating, relatively-thin positive and negative refraction material layers, embodiments herein solve or alleviate the limitations of conventional approaches for windows and domes that operate in the ultraviolet, visible, and infrared wavelength regimes. More specifically, exemplary embodiments address optical loss, the limitations of a two-layer composite of thick positive and negative index material slabs, the limitations of using only index-matching between the materials to achieve anti-reflection performance, and/or other limitations.

Embodiments of this disclosure also address the limitations of conventional approaches by eliminating altogether additional optical corrector elements and/or precision motion-control servo-mechanical subsystems that would be needed to correct for the aberrations in a conventional optical window or dome. Furthermore, embodiments of this disclosure avoid the size, weight, and complexity penalties of conventional adaptive optic subsystems and the attendant problem in obtaining a phasefront (or wavefront) measurement for aberration compensation.

Embodiments of this disclosure are applicable to dome structures, conformal windows, other optical windows, applications requiring passive (non-radiating) sensors (e.g., thermal imagers, and infrared search and track (IRST) systems), applications requiring active sensors (e.g., laser radar), and applications involving directed energy effectors (e.g., directed infrared countermeasures (DIRCM) and high energy laser weapons), and/or other applications.

The "index of refraction" (or simply "refractive index") of a given material refers to the fractional change in the "phase velocity" of light propagating within that medium. Index of refraction can be expressed as:

$$n = c/v, \quad \text{(EQN. 1)}$$

where n is the index of refraction in a medium for a given frequency, c is the speed of light in vacuum, and v is the phase velocity of light of that frequency in that medium.

Phase velocity is the speed at which the crests in the optical carrier advance in a medium. By contrast, "group velocity" refers to the speed at which a modulation envelope (i.e., the portion that carries information) advances in the medium. Both phase velocity and group velocity are dependent on the specific frequency of light and, due to dispersion and absorption resonances in natural media, are different for different frequencies. At the microscale, an electromagnetic wave's phase velocity is slowed in a material because the electric field creates a disturbance in the charges of each atom (primarily the electrons) proportional to the permittivity of the medium. The charges will, in general, oscillate slightly out of phase with respect to the driving electric field. The charges thus radiate their own electromagnetic wave that is at the same frequency but with a phase delay. The macroscopic sum of all such contributions in the material is a wave with the same frequency, but shorter wavelength than the original, leading to a slowing of the wave's phase velocity. Most of the radiation from oscillating material charges will modify the incoming wave, changing its velocity.

For all materials, index of refraction may be expressed as:

$$n = \sqrt{\epsilon_r \cdot \mu_r}, \quad \text{(EQN. 2)}$$

where $\epsilon_r$ is the relative permittivity of a material and $\mu_r$ is the relative susceptibility or permeability of the material. For naturally occurring transparent materials or those materials manufactured as optical materials, both relative permittivity and relative susceptibility are positive numbers (they may be less than 1 or have complex values at optical frequencies near resonance or for x-ray frequencies beyond transparency ranges).

Materials that display negative refractive behavior (i.e., negative refraction materials) can be classified as negative index materials and negatively refracting materials. Negative index materials (e.g., metamaterials or left-handed materials) are specially designed materials that employ 2-D or 3-D structures to alter the relative permittivity and/or permeability of the material. In the radio frequency (RF) regime, metamaterial structures are typically metallic patterns that act as sub-wavelength sized microwave circuits (e.g., split-ring resonators) that control the wave velocity of the transmitted RF radiation and the effective RF "impedance" of the material. A material in which both the permeability and permittivity are negative, is termed a "left-handed" material, which is in contrast to an "ordinary" or "right-handed" material (which obeys the right hand rule for electromagnetic propagation).

In the short wavelength optical regime, similar structures may be employed, but the scale size is several orders of magnitude smaller (e.g., in the nano-scale). Because metallic patterns tend to be very lossy at these wavelengths, other patterning approaches and materials may be advantageous. Such materials may include low dissipation conductive materials, semiconductors, high permittivity dielectrics, and/or other materials. The manner of coupling the electromagnetic field into and out of the integrated optical structures may also be different, with greater emphasis on displacement currents. Furthermore, the physics associated with field enhancement in regions surrounding these structures may require a different modeling approach.

Negatively refracting materials, while they do not have a negative index of refraction, still exhibit "negative refraction" within a range of propagation directions. For regular (positive) refraction that occurs at a surface between two media with positive but different refractive indices, any optical ray that is transmitted through this surface from the material of lower index to that of higher index will be bend toward the surface normal, in accordance with Snell's Law. For "negative refraction" the ray will bend away from the surface normal. There are three classes of positive index materials that may exhibit negative refraction: (1) isotropic media with strong anomalous dispersion, (2) anisotropic crystals and other media in which the group velocity vector is tilted with respect to the phase velocity vector, and (3) photonic bandgap (PBG) materials.

Isotropic media may have strong anomalous dispersion near a resonance in the material (i.e., an absorption peak). Dispersion in this context is a measure of how strongly the phase velocity, and hence the index of refraction, changes with the frequency of a transmitted optical wave. Normal dispersion is what gives rise to spatial separation of the colors of a rainbow, wherein the higher frequencies of visible light (e.g., violet and indigo) are refracted more strongly in a rain droplet than the lower frequencies (e.g., orange and red). For anomalous dispersion, light is refracted in the opposite direction, wherein the lower frequencies are refracted more strongly. Anomalous dispersion occurs near a material resonance. A very sharp resonance will produce a very radical dispersion characteristic and in some materials the index of refraction near the resonance peak can go below zero, giving rise to negative refraction. In a normal material, this radical dispersion characteristic is associated with strong optical loss because it occurs within an absorption peak. In these media, the orientation of the group velocity vector is opposite that of the phase velocity vector.

The second class of media for negative refraction refers to the case where the group velocity, which controls orientation of the rays, is strongly tilted with respect to the phase velocity, which controls propagation of phase fronts. This occurs in anisotropic media where the index of refraction (for a given polarization) changes relative to the angle between the propagating ray and one or more special orientations or axes within the medium. For uniaxial birefringent crystals (e.g., lithium niobate), the refractive index plotted as a function of propagation appears as an eccentric (non-spheric) ellipsoid of rotation about the special axis, called the "optic axis" or axis of symmetry. The phase velocity vector is, by a definition, always radial, while the group velocity vector is oriented as a surface normal to this ellipsoid. Negative refraction has been demonstrated at the boundary between two crystals with different orientations of the optic axis.

The third class of media exhibiting negative refraction is photonics bandgap (PBG) materials, which feature a composite structure comprising at least two different materials with different indices of refraction. The fine structure is a periodic or quasi-periodic array structure with spatial periods of the order of the propagating wavelength. Within such a PBG material, a propagating plane wave can experience spatial resonances with the fine structure that result in an "effective" refractive index of the wave and, hence, an "effective" length of the wave vector. The strength of the resonance depends on the direction of the wave propagates relative to the periodic array orientation, thereby producing a non-spheric index with an angle surface similar to the anisotropic media described earlier, but more complicated than an ellipsoid surface. Experiments have shown that, with proper spacing and orientation of the photonic crystal axes with respect to the refraction interface, the negative refraction for such PBG materials can be quite strong.

Embodiments of this disclosure may include use of known negative index materials and/or negatively refracting materials that exhibit negative refraction at optical wavelengths but are only feasible in thin layers. Metamaterials that operate at optical wavelengths can be manufactured using advanced nano-fabrication processes. They exist today exclusively as coatings with micron and sub-micron scale layer thickness. No technology yet exists for manufacturing bulk layers of optical metamaterials. The thickest layer of optical metamaterial ever manufactured was reported to be 51 µm for silver-filled membranes. But the optical properties of such porous metamaterial layers proved to be moderate, just $n<1$ instead of $n<0$. Metamaterials fabricated via standard nano-scale lithography, have demonstrated $n \approx -1$. A similar thickness limitation also applies to artificial PBG materials known today that operate at optical wavelengths. In addition, metamaterial and PBG layers may be relatively fragile. While mechanical properties of these structures have not been analyzed in detail, there is no evidence to suggest that thick layers of bulk metamaterial or PBG structures can be made mechanically strong.

Figure 2:
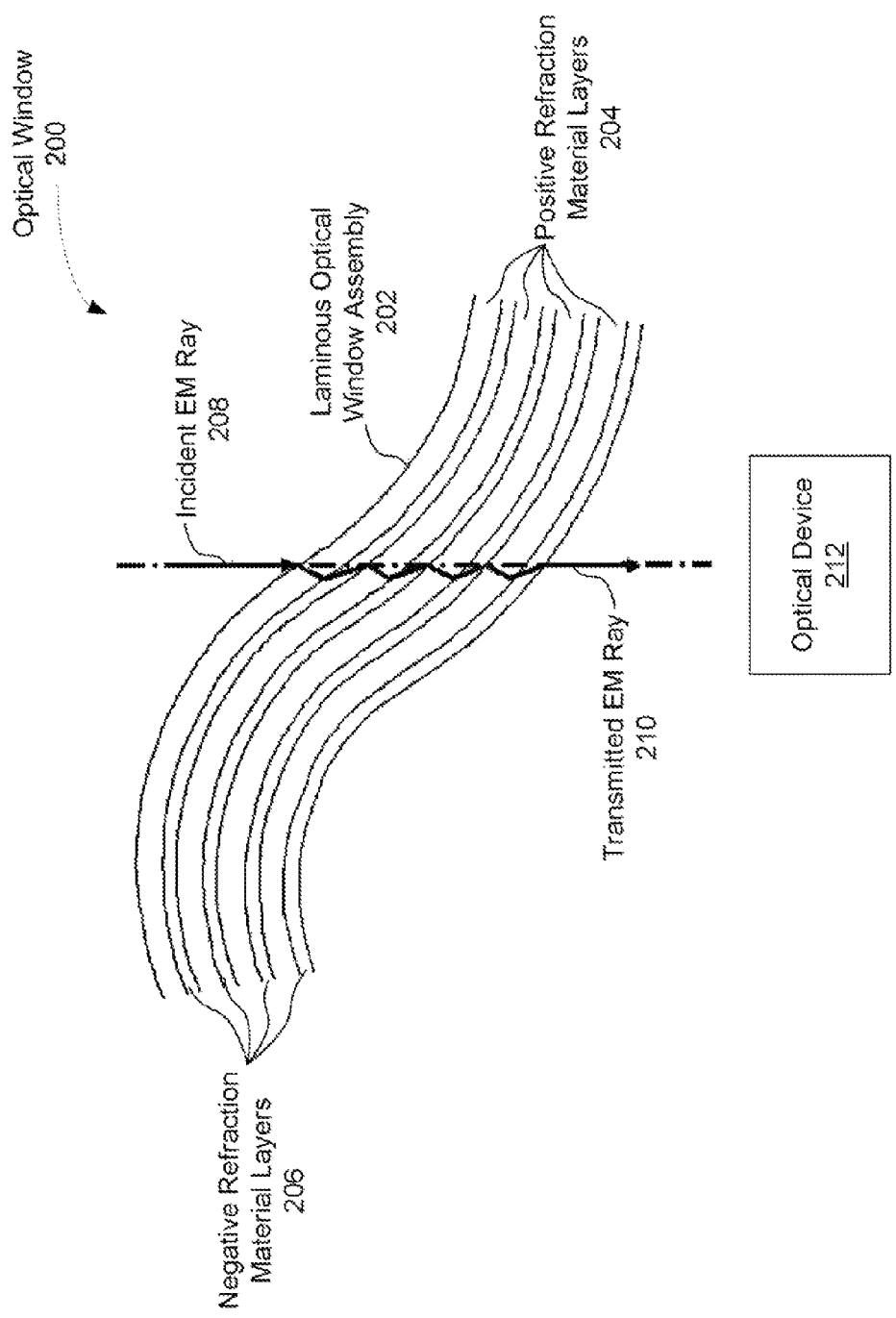
FIG. 2 illustrates a cross-sectional view of an optical window configured to minimize optical aberrations, according to one or more embodiments.

FIG. 2 illustrates a cross-sectional view of optical window 200 configured to minimize optical aberrations, according to one or more embodiments. Optical window 200 may include laminous optical window assembly 202 having four or more alternating layers. The alternating layers may include positive refraction material layers 204 and negative refraction material layers 206. The alternating layers may be configured to minimize refraction of electromagnetic rays propagating therethrough such that incident electromagnetic ray 208 is substantially collinear with corresponding transmitted electromagnetic ray 210, as illustrated in FIG. 2. The angle of incidence of incident electromagnetic ray 208 is less than a critical angle of total internal reflection attributed to laminous optical window assembly 202. An operating wavelength range associated with laminous optical window assembly 202 may include ultraviolet wavelengths, visible wavelengths, infrared wavelengths, and/or other short optical wavelengths. In some embodiments, optical window 200 may be configured to house optical device 212. Optical device 212 may be configured to receive electromagnetic rays (e.g., transmitted electromagnetic ray 210). Examples of optical device 212 may include a camera, an optical sensor, and/or other optical devices.

The optical performance of optical window 200, by employing alternating layers of thin positive and negative refraction materials, may be much improved relative to conventional two-thick-layer configurations, due at least in part to the reduced wedging and lateral displacement of ray propagation between the successive layers.

According to some embodiments, all or some portion of laminous optical window assembly 202 may be non-planar. Laminous optical window assembly 202 may be configured to be carried by a body having a complex aerodynamic shape (e.g., an aircraft or a missile). Laminous optical window assembly 202 may be shaped so as to be geometrically conformal with the aerodynamic shape of the body. This may, among other advantages, serve to reduce drag and/or radar cross section.

The material(s) and properties thereof selected for negative refraction material layers 206 may depend on any number of factors. In some embodiments, negative refraction material layers 206 may include a metamaterial. In some embodiments, negative refraction material layers 206 may include a positive index of refraction material that exhibits negative refraction for electromagnetic rays incident at one or more angles of incidence. The dielectric properties of individual ones of the alternating layers of laminous optical window assembly 202 may be selected based on a particular operating wavelength or wavelength range associated with laminous optical window assembly 202. In accordance with some embodiments, the absolute value of the index of refraction of one or more of positive refraction material layers 204 may be equal to the absolute value of the index of refraction of one or more negative refraction material layers 206. For example, a positive refraction material layer may have an index of refraction equal to 1 (positive one), whereas a negative refraction material layer may have an index of refraction equal to −1 (negative one). In some embodiments, the electromagnetic impedance of one or more of positive refraction material layers 204 may be equal to the electromagnetic impedance of one or more of negative refraction material layers 206.

The thickness of individual layers included in laminous optical window assembly 202 may depend on any number of factors. In some embodiments, the thickness of individual ones of the layers included in laminous optical window assembly 202 may be selected based on an operating wavelength range associated with laminous optical window assembly 202. A thickness ratio between one or more positive refraction material layers 204 and one or more negative refraction material layers 206 may be based on a difference between a refractive index of one or more positive refraction material layers 204 and a refractive index of one or more negative refraction material layers 206. As such, optical path lengths may be equal in one or more positive refraction material layers 204 and one or more negative refraction material layers 206 for an operating wavelength range associated with laminous optical window assembly 202. The thickness of one or more of positive refraction material layers 204 may be equal to the thickness of one or more negative refraction material layers 206. Individual ones of the alternating layers included in laminous optical window assembly 202 may have a thickness that is less than one hundred micrometers, since no bulk materials having negative refractive properties for short optical wavelengths are presently known. In exemplary embodiments, individual ones of the alternating layers included in laminous optical window assembly 202 may be classified as thin films. A thin film is a layer of material ranging from fractions of a nanometer (e.g., an atomic monolayer) to several micrometers in thickness.

The total number of individual layers included in laminous optical window assembly 202 may depend on any number of factors. According to various embodiments, the total number of layers included in laminous optical window assembly 202 may include tens of layers, hundreds of layers, thousands of layers, or other quantities of layers. The total number of layers included in laminous optical window assembly 202 may depend on one or more of a radius of curvature of laminous optical window assembly 202, an aperture size of an optical device (e.g., optical device 212) proximal to laminous optical window assembly 202, structural requirements of laminous optical window assembly 202, and/or other factors.

In some embodiments, laminous optical window assembly 202 may include an even number of positive refraction material layers and an odd number of negative refraction material layers. In such embodiments, negative refraction material layers 206 may be encapsulated on both surfaces of laminous optical window assembly 202 by positive refraction material layers 204. Locating mechanically strong positive refraction material layers 204 on both internal and external surfaces of laminous optical assembly 202 may offer desirable protection of negative refraction material layers 206 and/or other optical components or detectors. In other embodiments, laminous optical window assembly 202 may include an equal number of positive refraction material layers and negative refraction material layers. In such configurations, one surface of laminous optical window assembly 202 may expose positive refraction material layer 204, while the other surface may expose negative refraction material layer 206.

Laminous optical window assembly 202, in accordance with some embodiments, may include one or more coatings on either or both surfaces. Examples of such coatings may include an antireflective coating, a conductive coating, a protective coating, and/or other coatings. Coatings may be implemented to enhance performance of optical window 200, increase longevity of optical window 200, and/or provide other advantages.

The alternating layers of laminous optical window assembly 202 may be configured to minimize reflectivity of incident electromagnetic rays, in some embodiments. Because the alternating layers may be thin, destructive interference effects can be used to minimize reflective losses at each surface. The thickness of the layers may be tailored as a function of the operating wavelength(s) to optimize performance, similar to that which may be done with traditional dielectric anti-reflection coatings, which may minimize loss and/or deleterious back reflections. This approach may eliminate or reduce the need to match the absolute value of the refractive index between positive refraction material layers 204 and negative refraction material layers 206, thereby expanding the selection of possible materials and structures for both. Tailoring the thickness of the positive refraction material layers 204 and the negative refraction material layers 206 for destructive interference adds an additional degree of design freedom to tune the layer thicknesses and refractive properties for the desired refractive compensation and optical throughput. For true metamaterials, the electromagnetic impedance between neighboring layers may be matched, eliminating the reflection and the attendant need for thickness tailoring. The electromagnetic impedance Z may be expressed as:

$$Z=\sqrt{\in/\mu}, \qquad (\text{EQN. 3})$$

where $\in$ is the absolute permittivity of a material and $\mu$ is the absolute susceptibility or permeability of the material.

In exemplary embodiments, the alternating layers of positive refraction material layers 204 and negative refraction material layers 206 may be constituted by laminated sheets of negative refractive material(s) interspersed with positive refraction material(s). Such laminated sheets may be fabricated using traditional processing methods, such as those employed in the manufacture of safety glass for automobiles. The final form of optical window 200 may be obtained from a planar laminated sheet structure using the "slumping" process known in the art, wherein the planar laminated sheet structure is heated just below the melting point and allowed to slump due to gravity over a surface mold.

In some embodiments, there may be residual, higher order refractive effects that may be compensated. Embodiments of this disclosure may be used advantageously in conjunction with other compensation schemes, such as varying window thickness across optical window 200, including weak lens and mirror elements to a gimbaled optical system that are articulated as a function of look angle through optical window 200, including a deformable mirror and suitable control system with optical window 200, and/or other compensation schemes.

Although various embodiments have been described in detail for the purpose of illustration based on what is currently considered to be the most practical implementation, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that disclosure contemplates that, to the extent possible, one or more features of any embodiment can be combined with one or more features of any other embodiment.

What is claimed is:

1. An optical window configured to minimize optical aberrations, the optical window comprising:
   a laminous optical window assembly having four or more alternating layers of positive refraction material layers and negative refraction material layers, the four or more alternating layers configured to minimize refraction of electromagnetic rays propagating therethrough such that a given incident electromagnetic ray is substantially collinear with a corresponding transmitted electromagnetic ray, the negative refraction material layers including a positive index of refraction material that exhibits negative refraction for electromagnetic rays incident at one or more angles of incidence.

2. The optical window of claim 1, wherein the laminous optical window assembly is non-planar.

3. The optical window of claim 1, wherein the laminous optical window assembly is configured to be carried by a body having an aerodynamic shape, and wherein the laminous optical window assembly is shaped so as to be geometrically conformal with the aerodynamic shape of the body.

4. The optical window of claim 1, wherein an angle of incidence of the given incident electromagnetic ray is less than a critical angle of total internal reflection attributed to the laminous optical window assembly.

5. The optical window of claim 1, wherein the negative refraction material layers include a metamaterial.

6. The optical window of claim 1, wherein respective dielectric properties of individual ones of the four or more alternating layers are selected based on an operating wavelength range associated with the laminous optical window assembly.

7. The optical window of claim 1, wherein respective thicknesses of individual ones of the four or more alternating layers are selected based on an operating wavelength range associated with the laminous optical window assembly.

8. The optical window of claim 1, wherein a thickness ratio between one or more positive refraction material layers and one or more negative refraction material layers is based on a difference between a refractive index of the one or more positive refraction material layers and a refractive index of the one or more negative refraction material layers such that optical path lengths are equal in the one or more positive refraction material layers and in the one or more negative refraction material layers for an operating wavelength range associated with the laminous optical window assembly.

9. The optical window of claim 1, wherein the thickness of one or more of the positive refraction material layers is equal to the thickness of one or more of the negative refraction material layers.

10. The optical window of claim 1, wherein the absolute value of the index of refraction of one or more of the positive refraction material layers is equal to the absolute value of the index of refraction of one or more of the negative refraction material layers.

11. The optical window of claim 1, wherein the electromagnetic impedance of one or more of the positive refraction material layers is equal to the electromagnetic impedance of one or more of the negative refraction material layers.

12. The optical window of claim 1, wherein individual ones of the four or more alternating layers have a thickness that is less that one hundred micrometers.

13. The optical window of claim 1, wherein individual ones of the four or more alternating layers are classified as thin films.

14. The optical window of claim 1, wherein a total number of layers included in the laminous optical window assembly depends on one or more of a shape or curvature of the laminous optical window assembly, an aperture size of an optical device proximal to the laminous optical window assembly, or structural requirements of the laminous optical window assembly.

15. The optical window assembly of claim 1, wherein the laminous optical window assembly includes an even number of positive refraction material layers and an odd number of negative refraction material layers.

16. The optical window assembly of claim 1, wherein the laminous optical window assembly includes an equal number of positive refraction material layers and negative refraction material layers.

17. The optical window assembly of claim 1, wherein the four or more alternating layers includes fifty or more alternating layers.

18. The optical window of claim 1, wherein the laminous optical window assembly further comprises one or more coatings on one or more surfaces, at least one of the one or more coatings being configured to provide one or more of antireflection, conduction, or protection at the one or more surfaces.

19. The optical window of claim 1, wherein the four or more alternating layers are further configured to reduce reflectivity of incident electromagnetic rays to a desired value.

20. The optical window of claim 1, wherein an operating wavelength range associated with the laminous optical window assembly includes one or more of ultraviolet wavelengths, visible wavelengths, or infrared wavelengths.

21. A system comprising:
an optical device configured to receive and/or transmit electromagnetic energy; and
an optical window configured to house the optical device and to minimize refraction of electromagnetic energy propagating therethrough such that a given incident electromagnetic ray is substantially collinear with a corresponding transmitted electromagnetic ray that is received by the optical device, the optical window including a laminous optical window assembly having four or more alternating layers of positive refraction material layers and negative refraction material layers, wherein a total number of layers included in the laminous optical window assembly depends on one or more of a shape or curvature of the laminous optical window assembly, an aperture size of the optical device, or structural requirements of the laminous optical window assembly.

22. A laminous optical window assembly configured to minimize optical aberrations and comprising:
four or more alternating layers of positive refraction material layers and negative refraction material layers, the four or more alternating layers configured to minimize refraction of electromagnetic rays propagating therethrough such that a given incident electromagnetic ray is substantially collinear with a corresponding transmitted electromagnetic ray, the laminous optical window assembly including an even number of positive refraction material layers and an odd number of negative refraction material layers.

* * * * *